United States Patent [19]

Saito et al.

[11] Patent Number: 5,572,012

[45] Date of Patent: Nov. 5, 1996

[54] DISTANCE MEASURING DEVICE FOR CAMERA USING INTEGRATION OF REFLECTED LIGHT

[75] Inventors: Hiroyuki Saito; Akira Ito, both of Yotsukaido, Japan

[73] Assignee: Seiko Precision Inc., Japan

[21] Appl. No.: 260,353

[22] Filed: Jun. 15, 1994

[30] Foreign Application Priority Data

Jun. 16, 1993 [JP] Japan .................... 5-145095
Jun. 16, 1993 [JP] Japan .................... 5-145096

[51] Int. Cl.$^6$ ............................. G03B 13/36
[52] U.S. Cl. .................... 250/201.6; 250/201.4; 396/106
[58] Field of Search ................ 250/201.6, 201.4, 250/201.2, 559.31, 214 AG; 354/403, 402, 163; 356/3.01, 3.04, 3.06

[56] References Cited

U.S. PATENT DOCUMENTS

| | | | |
|---|---|---|---|
| 4,720,723 | 1/1988 | Harunari et al. ............ | 354/403 |
| 4,758,082 | 7/1988 | Kozuki et al. ............... | 356/1 |
| 4,760,419 | 7/1988 | Fujiwara et al. ............ | 354/403 |
| 4,796,044 | 1/1989 | Amanuma et al. .......... | 354/403 |
| 5,008,695 | 4/1991 | Nagaoka et al. ............ | 354/403 |
| 5,068,540 | 11/1991 | Tsuji ........................... | 250/559.31 |
| 5,128,529 | 7/1992 | Nagaoka et al. ............ | 250/201.6 |
| 5,148,011 | 9/1992 | Taka ............................ | 250/201.6 |
| 5,157,435 | 10/1992 | Min et al. .................... | 354/403 |
| 5,221,955 | 6/1993 | Inoue .......................... | 356/1 |
| 5,444,511 | 8/1995 | Seki et al. ................... | 354/403 |

FOREIGN PATENT DOCUMENTS

| | | |
|---|---|---|
| 0175580 | 3/1986 | European Pat. Off. . |
| 4131808 | 4/1992 | Germany . |
| 2272592 | 5/1994 | United Kingdom . |

Primary Examiner—Edward P. Westin
Assistant Examiner—John R. Lee
Attorney, Agent, or Firm—Adams & Wilks

[57] ABSTRACT

A distance measuring device for a camera projects a pulsed light beam toward a subject and converts the reflected light from the subject to a voltage which is integrated by an integrating circuit. The output of the integrating circuit is compared with a first reference voltage until the level thereof exceeds the first reference voltage, and then the output of the integrated circuit is compared with a second reference voltage until the level thereof reaches the second reference voltage. The distance to the subject is calculated depending on the number of times the integration operation is performed.

13 Claims, 17 Drawing Sheets

| X | D (m) |
|------|------|
| 0.50 | ∞ |
| 0.55 | 3.70 |
| 0.60 | 1.85 |
| 1.00 | 0.37 |

Fig. 4

| INTEGRATION TIME \ GAIN | ×32 | ×16 | ×8 |
|---|---|---|---|
| 64 μs | a  1 | b  $\frac{1}{2}$ | c  $\frac{1}{4}$ |
| 8 μs | d  $\frac{1}{8}$ | e  $\frac{1}{16}$ | f  $\frac{1}{32}$ |
| 1 μs | g  $\frac{1}{64}$ | h  $\frac{1}{128}$ | i  $\frac{1}{256}$ |

Fig. 10

DISTANCE MEASURING DEVICE FOR CAMERA USING INTEGRATION OF REFLECTED LIGHT

BACKGROUND OF THE INVENTION

The present invention generally pertains to a distance measuring device and more particularly to a distance measuring device capable of emitting a distance measuring infrared light beam to a subject and receiving reflected infrared light from the subject to perform distance measurement.

In a conventional distance measuring device, an infrared light beam is projected toward a subject, and infrared light reflected from the subject is received by a light receiving device. Since the intensity and angle of incidence of the reflected light on the light receiving device is varied in accordance with the distance of the subject therefrom, the subject distance can be measured by determining the angle of incidence of light received by the receiving device.

A position sensitive device (PSD) is frequently used as a light receiving device. The PSD has two output terminals, and a current is generated at each output terminal depending on the intensity and angle of incidence of received light reflected from the subject. In a conventional PSD, the current output at one terminal is larger in magnitude when the subject is located at relatively large distances. The current output at the second terminal of the PSD becomes larger when the subject is located at relatively smaller distances from the light emitting unit. By calculating the ratio of the two generated currents or the corresponding two voltages, a signal which is dependent on only the angle of incidence of the reflected light can be obtained from the PSD.

A distance measuring device has been proposed in which an infrared light-emitting diode (IRED) is pulse driven to project an infrared light beam toward a subject. Infrared light reflected by the subject is detected by a PSD. The signal from the PSD is subjected to AC coupling to extract only a signal component, and the signal component thus obtained is suitably amplified. The amplified signal is integrated within the positive going pulses corresponding to the light emitting time, and the integration is repeated until the integration voltage reaches a predetermined voltage to thereby set the frequency of the integration in accordance with the intensity of the signal from the PSD.

The integration frequencies obtained until the two outputs from the PSD reach a predetermined voltage can be represented by Nf and Nn respectively. By calculating a value X in Equation 1, a stable distance measuring operation can be maintained irrespective of the reflectivity of the subject.

$$X=Nf/(Nf+Nn) \quad (EQUATION\ 1)$$

Using the conventional method of calculating the value X from the integration frequencies Nf and Nn as described above there are numerous drawbacks, for example, if Nf and Nn are set at large values to improve distance measuring precision, count errors in the vicinity of a predetermined voltage become small and the distance measuring precision is improved. However, setting Nf and Nn to large values also results in the distance measuring time being lengthened. Conversely, if Nf and Nn are set at small values, while count errors in the vicinity of the predetermined voltage become larger, the distance measuring time is desirably shortened. However, while setting Nf and Nn to small values results in a shortened distance measurement time, it also results in the resolution being reduced and distance measuring precision being lowered.

Moreover, the signal subjected to the AC coupling described above is varied in intensity in accordance with the distance to the subject and the reflectivity of the subject. If the values Nf and Nn are set at large values, the precision of the value of X can be improved. However, in order to improve the precision of the calculated value of X, a variable-gain amplifier must be provided so that the device can detect small signals reflected by relatively distant subjects by using a large gain factor and can also detect large signals reflected from nearby subjects or subjects which are highly reflective using a small gain factor. However, the number of available gains which can be set in the amplifying circuit is increased and the size and complexity of the circuit is disadvantageously increased. There is therefore a need for a distance measuring device capable of precise distance measurement, yet small in size and able to perform distance measurement in a rapid time.

SUMMARY OF THE INVENTION

An object of the present invention is to provide an improved distance measuring device for a camera. Which overcomes the aforementioned drawbacks.

In accordance with a first embodiment of the present invention, light emitting means projects light (i.e., infrared pulses) toward a subject. The infrared light reflected from the subject is received by light receiving means and a corresponding output signal is produced by the light receiving means. Amplifying means amplifies the output signal of the light receiving means and an integrating means integrates an output signal of the amplifying means and produces an integrated output signal. Comparing means compares the integrated output signal with a first predetermined value and produces a comparison output signal when the integrated output signal is higher than the first predetermined value and then compares the integrated output signal with a second predetermined value until the integrated output signal exceeds the second predetermined value. Switching means switches a gain of the amplifying means when the integrated output signal exceeds the first predetermined value and calculating means then calculates the distance to the subject based upon the number of integrations performed by the integrating means.

In accordance with the first embodiment of the present invention, the output signal of the light receiving device is integrated with normal precision until the integration voltage reaches a second predetermined value (i.e., the second reference voltage) lower than a first predetermined value (i.e., the first reference voltage). The output signal of the light receiving device is then integrated with a higher precision by switching the input resistance to the integrating circuit. Consequently, the integration time is substantially reduced with no accompanying reduction in precision of distance measurement as in the conventional device.

In accordance with a second embodiment of the present invention, a pulsed light beam is projected toward the subject, and the gain of the amplifying circuit is adjusted by adjusting the integrating time in accordance with the level of reflected light. As a result, when the level of the reflected light is very high, the integration time of the integrating circuit is shortened in a state where the gain is minimum, and distance measuring precision is maintained without saturating the amplifying circuit.

BRIEF DESCRIPTION OF THE DRAWINGS

FIG. 4 is a table for obtaining a distance on the basis of a value X;

FIG. 10 is a diagram showing gains which can be set in the second embodiment shown in FIG. 8;

DETAILED DESCRIPTION OF THE INVENTION

Figure 1:
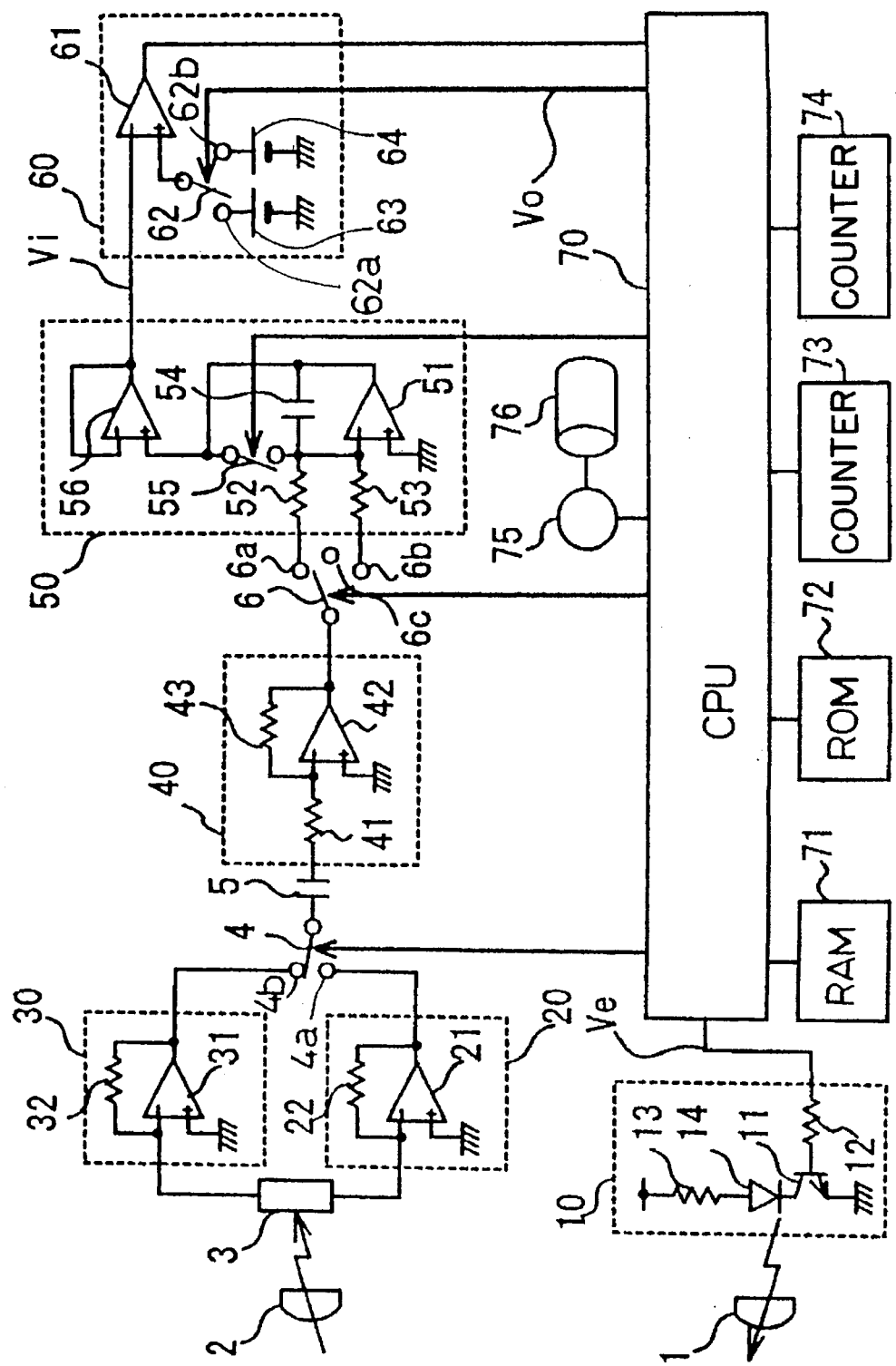
FIG. 1 is a schematic diagram showing a first embodiment of a distance measuring device in accordance with the present invention.

A first embodiment of a distance measuring device in accordance with the present invention will be described with reference to FIG. 1. A light emitting circuit 10 emits a distance measuring beam toward a subject. The light emitting circuit 10 serves as a driving circuit for driving an infrared light-emitting diode (IRED) 14, and comprises a transistor 11, a base resistor 12, a current limiting resistor 13 and the IRED 14. A position sensitive device (PSD) 3 receives reflected light from a subject (not shown) and outputs a current signal corresponding to the intensity and angle of incidence of light received to current-voltage conversion circuits 20 and 30.

Together with the PSD 3, the current-voltage conversion circuits 20 and 30 each constitute an individual light receiving circuit. Upon the incidence of light on the PSD 3, the PSD 3 outputs a current corresponding to the intensity and angle of incidence of the light to each of the current-voltage conversion circuit 20 and the current-voltage conversion circuit 30. For example, in this embodiment the terminal of the PSD 3 which provides a stronger output current due to nearby objects is connected to the current-voltage converting circuit 30 and the terminal of the PSD 3 which provides a stronger output current due to distant objects is connected to the current-voltage converting circuit 20. The current-voltage conversion circuit 20 comprises an amplifier 21 and a feedback resistor 22, and outputs a voltage which is proportional to an input current. The current-voltage conversion circuit 30 comprises an amplifier 31 and a feedback resistor 32, that is, the same construction as the current-voltage conversion circuit 20, and outputs a voltage which corresponds to an input current.

A switch 4 having terminals 4a and 4b transmits therethrough either one of the outputs of the current-voltage conversion circuit 20 or the current-voltage conversion circuit 30, and the state of the switch 4 is controlled by a CPU 70. The CPU 70 controls the switch 4 such that it selects the current-voltage conversion circuit 20 (terminal 4a) when distance measurement is carried out using a signal from a terminal of the PSD 3 which becomes larger when the subject is located at a relatively far distance. The switch 4 is switched to select the current-voltage conversion circuit 30 (terminal 4b) when distance measurement is carried out using a signal from the other terminal of the PSD 3 which becomes larger when the subject is located at relatively short distances.

An amplifying circuit 40 is connected at the opposite side of the switch 4 and receives the outputs of the current-voltage circuits 20,30 and the amplifying circuit 40 amplifies the signal which is selected by the switch 4. The polarity of the output signal for inversion amplification by amplifying circuit 40 is opposite that of the power source voltage.

A switch 6 having terminals 6a, 6b and 6c is disposed between the amplifying circuit 40 and an integration circuit 50, and determines whether the input resistor of the amplifying circuit 51 in an integrating circuit 50 is an input resistor 52 or an input resistor 53. The input resistor 52 has a resistance value one-tenth that of the input resistor 53 and thus, the gain of the amplifier 51 when the input resistor 53 is selected is one-tenth the gain when the input resistor 52 is selected. Further, it is possible to select no resistor, in which case the output of the amplifying circuit 40 is not transmitted to the integrating circuit 50.

The integrating circuit 50 comprises the amplifier 51, the input resistor 52, the input resistor 53, an integrating capacitor 54, a switch 55 and a voltage follower 56, and serves to perform time integration on an input voltage. Prior to performing an integrating operation, however, the switch 55 is switched on to discharge any charge remaining in the integrating capacitor 54. The switch 55 is switched off when sufficient discharge has occurred. During the integrating operation initiated by the switching-on of the switch 6 in one of the aforementioned positions, the integrating capacitor 54 stores the time integration value of an input signal in the form of a charge. During this time, the voltage across the terminals of the integrating capacitor 54 is output to a comparator 61. Upon completion of the integrating operation, the switch 6 is switched off (terminal 6c).

A level judgment circuit 60 comprises the comparator 61, a first reference voltage source 63 and a second reference voltage source 64, and serves to judge the level of the input voltage. The comparator 61 serves to compare an integration voltage Vi with the voltage V1 of the first reference voltage source 63 or the voltage V2 of the second reference voltage source 64 which is selected by the switch 62. The comparator 61 converts the result to a digital signal output voltage Vo which is then output to the CPU 70.

The CPU 70 performs data communication with a RAM 71, a ROM 72, a counter 73 and a counter 74, and outputs a driving signal to the light emitting circuit 10 and a motor 75. The motor 75 drives a lens barrel 76.

Next, the operation of the circuit of the first embodiment of the present invention will be described. Upon partial actuation of a shutter release switch (not shown), for example, the CPU 70 initiates a distance measuring routine, and activates the power sources for all of the circuitry shown in FIG. 1. Next, the CPU 70 clears the contents of the RAM 71, and outputs a pulsed light emitting driving signal Ve to the light emitting circuit 10. In response to the light emitting driving signal Ve the base resistor 11 drives the IRED 14 during the high ("H") level portions of the light emitting driving signal, and the IRED 14 emits light. The emitted light is focused by a light emitting lens 1, projected toward a subject and then reflected by the subject (not shown). The reflected light is then focused again by a light receiving lens 2 and enters the PSD 3.

Distance measurement by the distance measuring device of the present invention is performed in a number of steps under control of the CPU 70 and the CPU 70 sequentially activates the various switches 4, 6, 55 and 62 in order to selectively activate portions of the aforementioned circuitry. In the present embodiment, distance measurement is first performed using the current-voltage converting circuit 20 to perform measurement using the PSD 3 terminal more sensitive to light reflected from distant subjects. At a desired time, as described below, measurement is then performed using the current-voltage converting circuit 30 to perform measurement using the PSD 3 terminal more sensitive to light reflected by relatively nearby objects.

Figure 2:
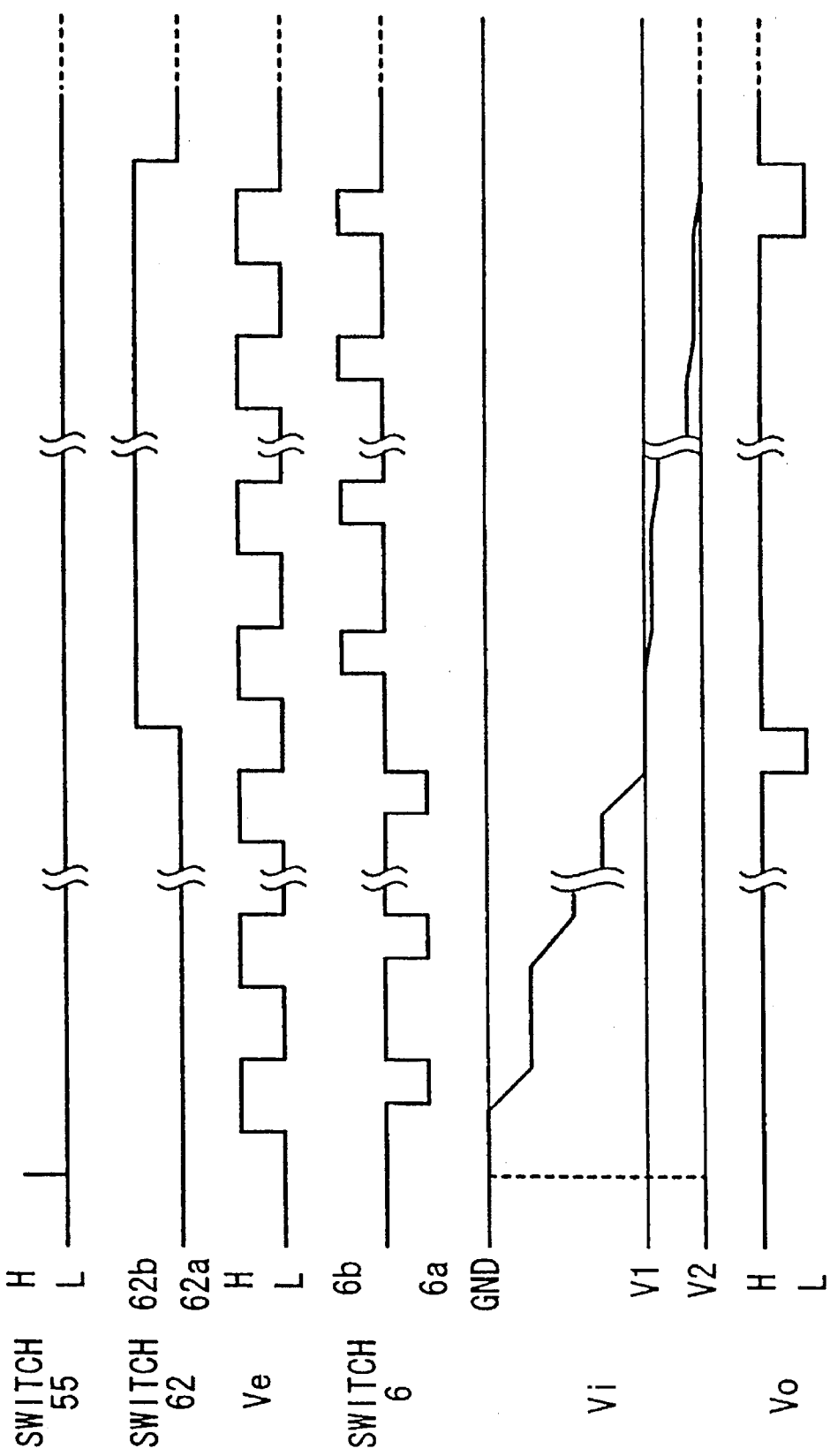
FIG. 2 is a diagram showing an integrating operation of the embodiment shown in FIG. 1.
Figure 3:
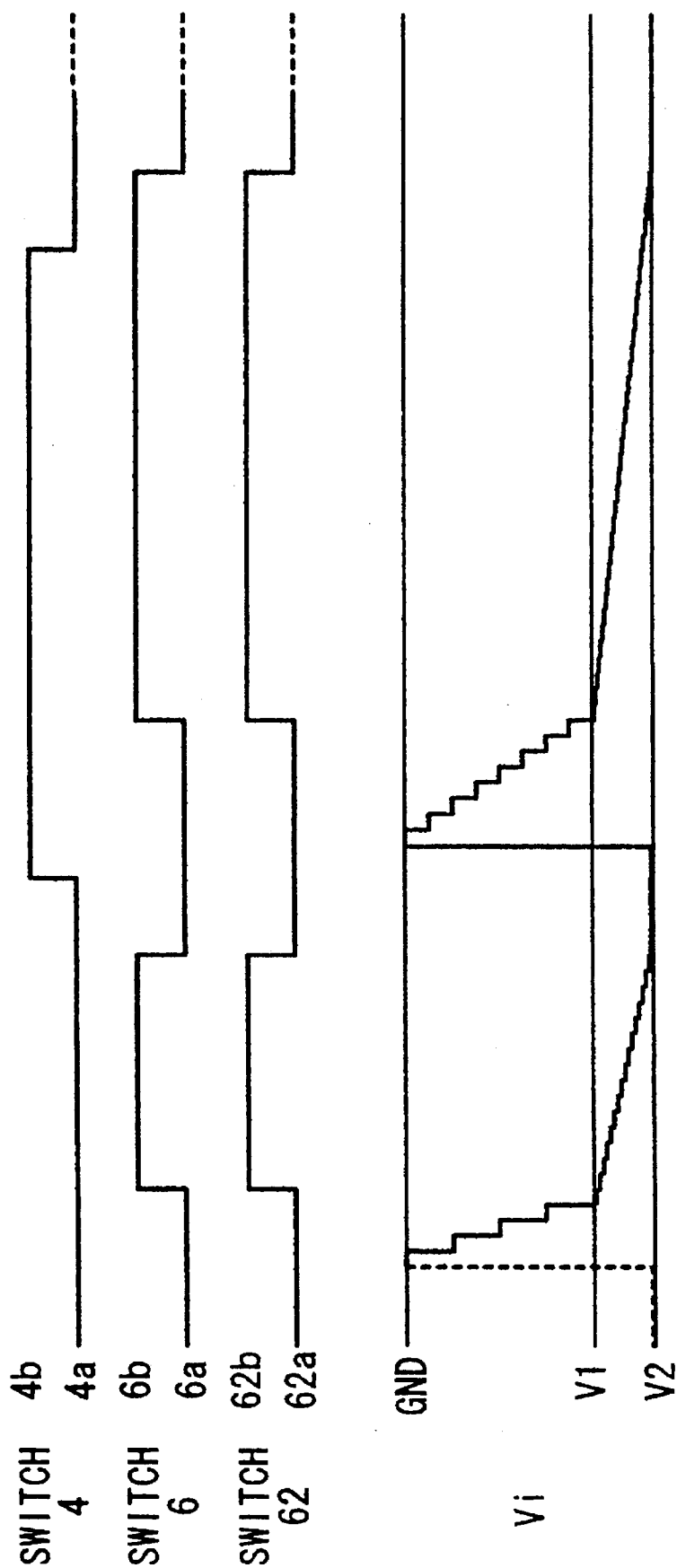
FIG. 3 is a diagram showing a series of operations for a distance measuring operation of the embodiment shown in FIG. 1.

Distance measurement using the current-voltage conversion circuit 20 to determine the value of Nf will be described with reference to FIGS. 1, 2 and 3. The switch 4 is switched to select the current-voltage conversion circuit 20 (terminal 4a). The switch 62 is switched to select the first reference voltage source 63 (terminal 62a), and the switch 6 is switched to select the input resistor 52 (terminal 6a). Next, the switch 55 is closed to discharge the charge stored in the integrating capacitor 54. After the charge is sufficiently discharged, the switch 55 is opened. Thereafter, the value Nf previously stored in the counter 73 is cleared, and distance measurement is started using the current-voltage conversion circuit 20. The distance measuring method is shown by the timing diagram of FIG. 2. A value of 10 is added to the value Nf stored in the counter 73 while repeating light emission, the switch 6 is switched to select the input resistor 53 (terminal 6b) and the switch 62 is switched to select the second reference voltage source 64 (terminal 62b) at the time when the integration voltage Vi reaches V1 of the first reference voltage source 63. Then, a value of 1 is added to the value Nf stored in the counter 73 while the same operation is repeated again, and the routine is ended when the integration voltage Vi reaches V2 of the second reference voltage source 64. If the integration voltage does not reach V2 even when light has been emitted a predetermined number of times Nc (because the distance to the subject is too far), the distance is judged as infinite, and an infinite flag is set in the RAM 71, and the routine is completed. Otherwise, the value Nf stored in the counter 73 at the time of completion of distance measurement is stored in a suitable address of the RAM 71.

Subsequently, the CPU 70 performs distance measurement using the current-voltage conversion circuit 30 to determine the value of Nn. First, the switch 4 is switched to select the current-voltage conversion circuit 30 (terminal 4b), the switch 62 is switched to terminal 62a (the reference voltage source 63 side), and the switch 6 is switched to terminal 6a (the input resistor 52 side). Next, the switch 55 is closed to discharge any remaining charge in the integration capacitor 54. After the charge is sufficiently discharged, the switch 55 is opened. Thereafter, the value Nn previously stored in the counter 74 is cleared to 0, and the distance measuring operation in the current-voltage conversion circuit 30 is started. The distance measuring method is as shown in FIG. 2. A value of 10 is added to the value Nn stored in the counter 74 repeating the light emission, and when the integration voltage Vi reaches V1 of the reference voltage source 63, the switch 6 is switched to terminal 6b (the input resistor 53 side), and the switch 62 is switched to terminal 62b, (the reference voltage source 64 side), thereby attenuating the input signal to the integrating circuit 50 to one-tenth of its prior value. Accordingly, higher integration resolution can be obtained without any accompanying increase in integration time. A value of 1 is added to the value Nn stored in the counter 74 while repeating the same operation iteratively, and the routine is completed when the integration voltage Vi reaches V2 of the second reference voltage source 64. The value Nn remaining in the counter 74 at the time of completion of the distance measurement is stored in a suitable address of the RAM 71.

Figure 4:
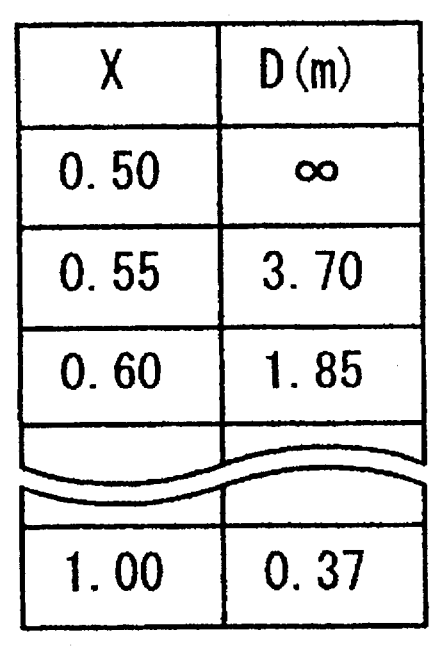

Upon completion of the multiple integration distance measurement process described above, the CPU 70 determines the distance to the subject to be "infinite" if the infinite flag is set, and if not, the CPU 70 calculates the value of X using the values Nf and Nn which are stored in the RAM 71. After the value of X has been calculated, as shown in FIG. 4, an address of the ROM 72 determined by the value of X is referred to in order to determine the distance to the subject in accordance, for example with a ROM look-up table. In accordance with the results, the motor 75 is controlled to drive the lens barrel 76 so that the lens becomes accurately focused on the subject. Finally, the CPU 70 deactivates the power sources for all the 6f circuitry in FIG. 1, and completes the distance measuring routine. FIG. 3 shows level changes of various elements in FIG. 1 during the distance measuring operation.

Figure 5:
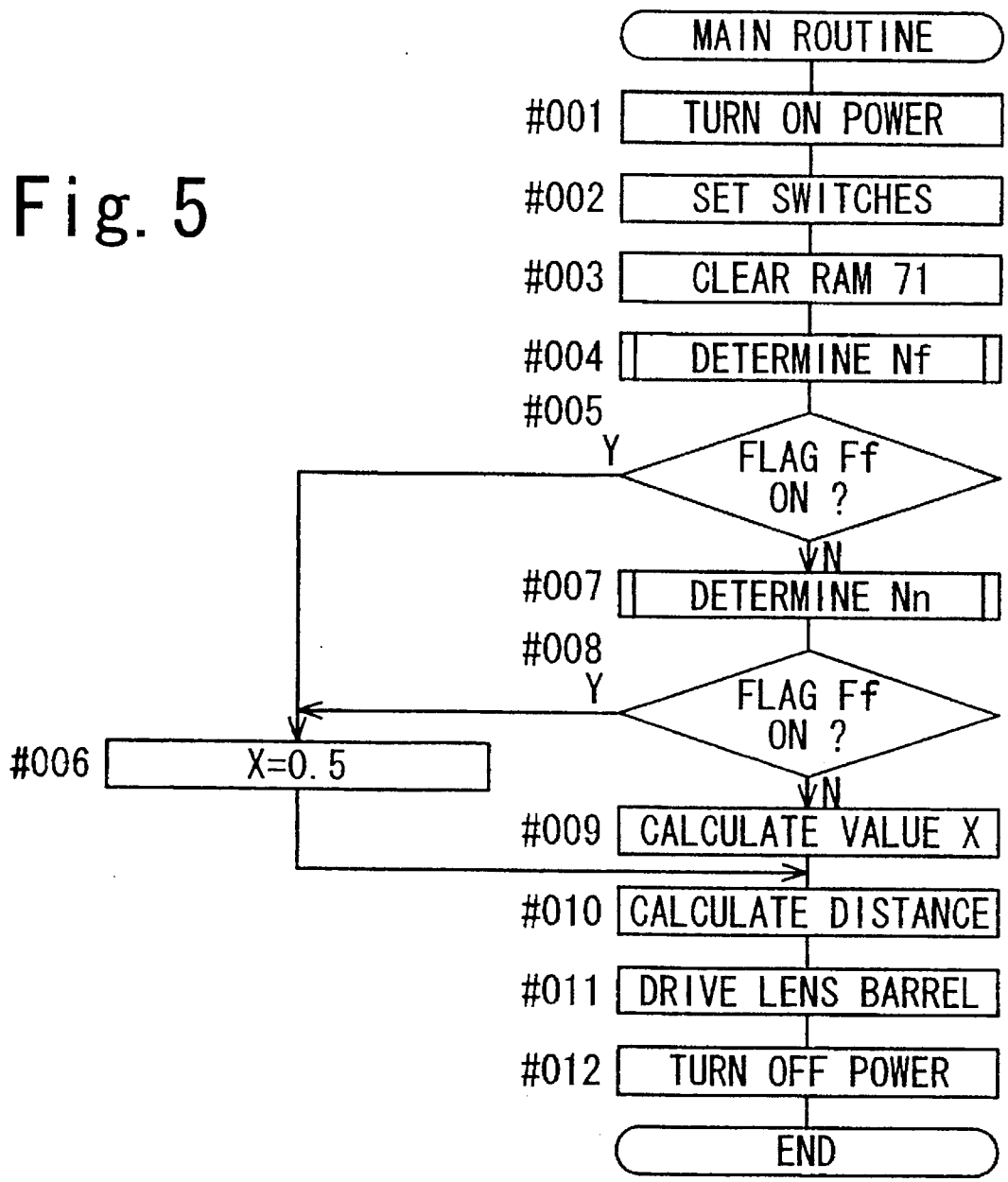
FIG. 5 is a flowchart showing the steps performed in a main routine for operation of the embodiment shown in FIG. 1.
Figure 6:
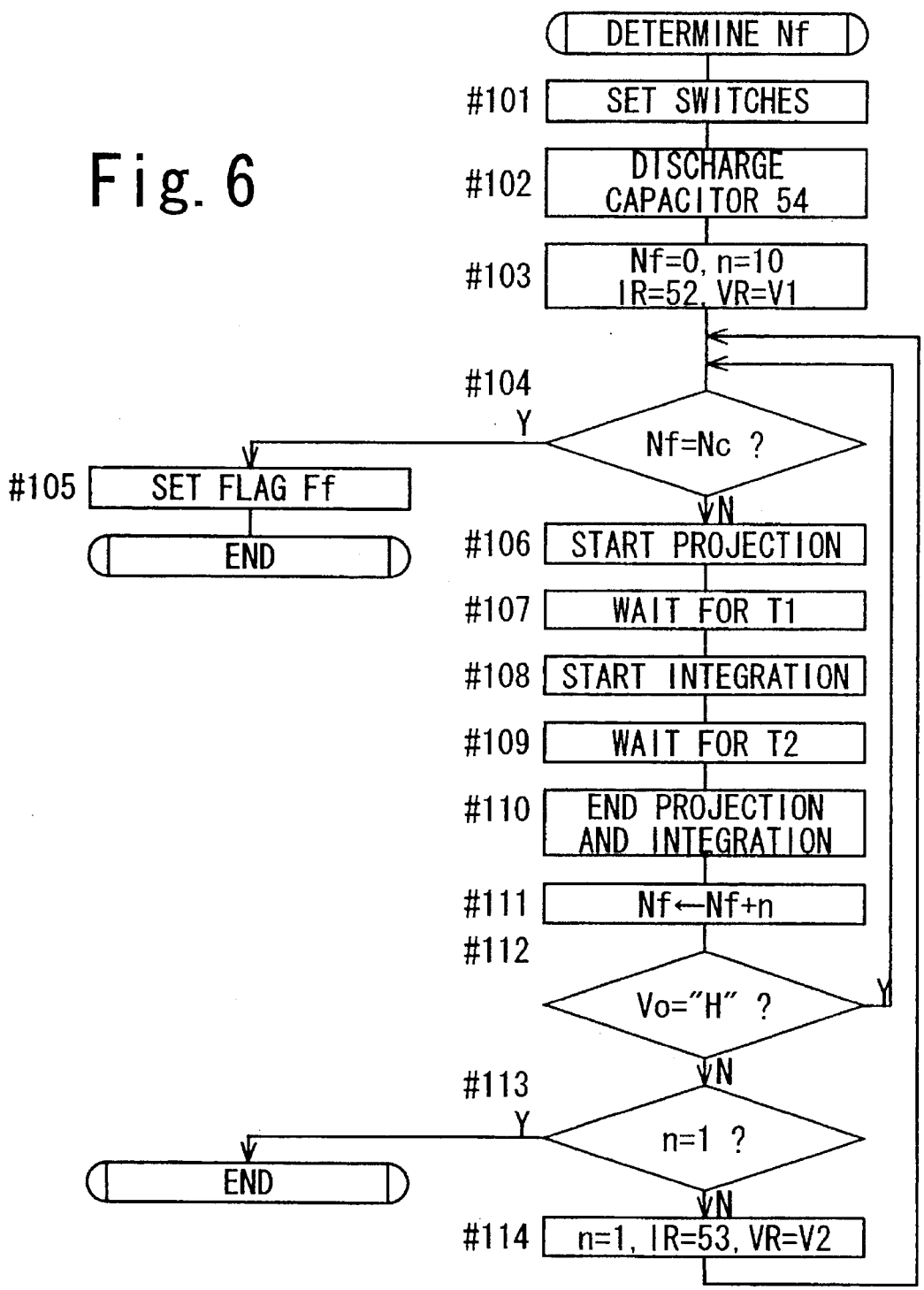
FIG. 6 is a flowchart for a sub-routine for a distance measurement operation.
Figure 7:
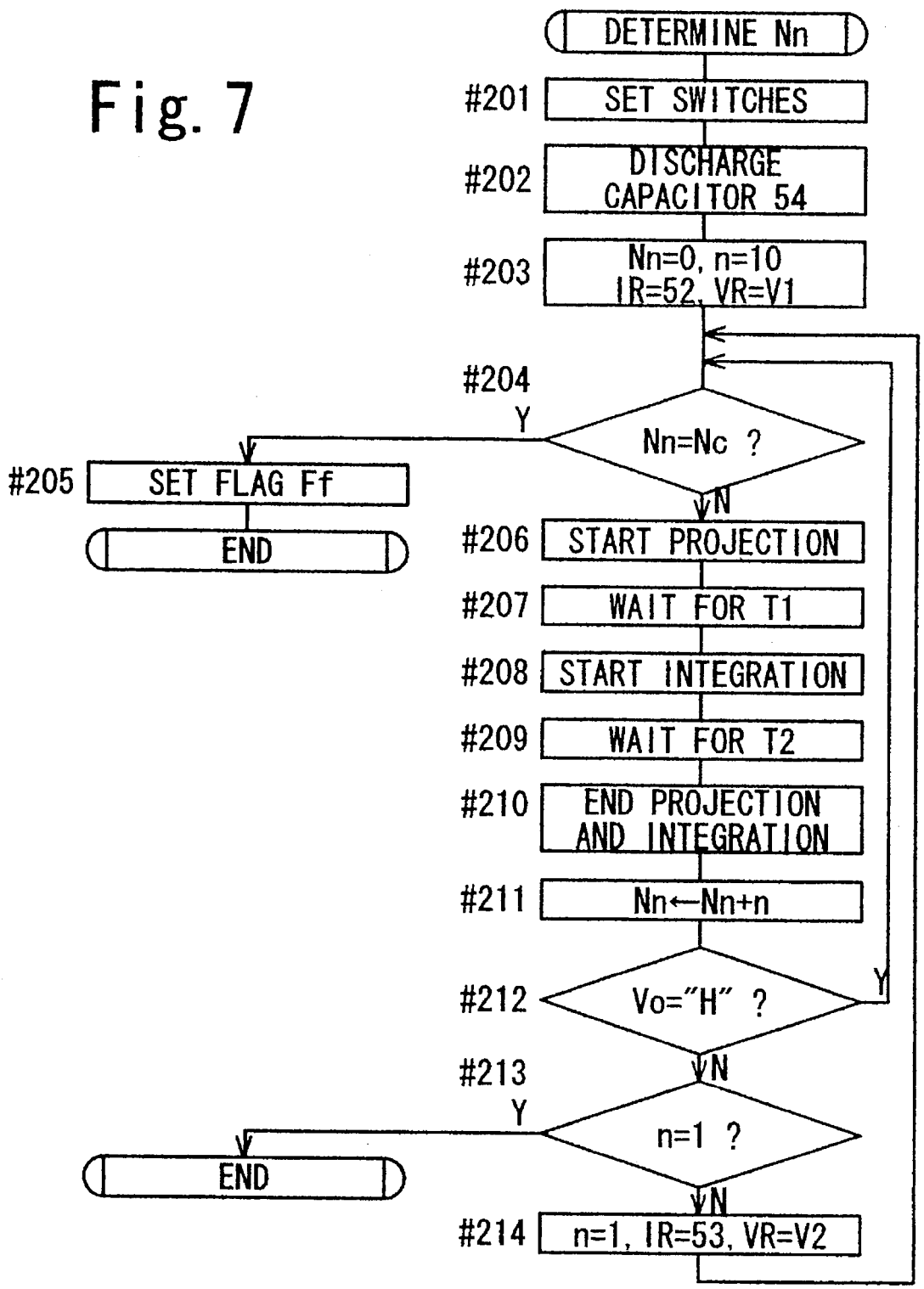
FIG. 7 is a flowchart for a sub-routine for a distance measurement operation.

The operation of the circuit according to the embodiment described proceeds in accordance with a central program stored in the ROM 72. The flow chart for the above operation is shown in FIGS. 5 to 7. First, the main routine will be described with reference to FIG. 5. Upon initiating this routine, the CPU 70 switches on the power source for the whole distance measuring circuit (#001). Next, switch 4 connects with terminal 4a, switch 6 connects with terminal 6c, switch 55 is turned to off, switch 62 connects with terminal 62a (#002), and the content of the RAM 71 is cleared (#003). Thereafter, distance measurement is performed using the current-voltage conversion circuit 20, and the value Nf is stored in the RAM 71 (#004). At the same time, the state of the flag Ff is checked, and the program jumps to #006 if the flag Ff is set (#005). In the event that flag Ff is set, 0.5 is substituted for the value of X (#006). Likewise, distance measurement in the current-voltage conversion circuit 30 is performed, and the value Nn is stored in the RAM 71 (#007). At the same time, the state of the flag Ff is checked, and the program jumps to step #006 if the flag Ff is set (#008). In this case, 0.5 is substituted for the value of X (#006). The values Nf and Nn which are stored in the RAM 71 in the sub-routines performed at step #004 and step #007 are read out to calculate the value of X (#009). If the value of X is equal to 0.5, it is judged as infinite. Otherwise, as shown in FIG. 4, an address of the ROM 72 which is determined according to the value of X is referred to in order to calculate the distance to the subject (#010). Finally, the CPU 70 drives a lens barrel 76 corresponding to the measured distance (#011). Upon initiating this lens driving routine, the CPU 70 switches off the power source for the distance measuring circuitry (#012).

Next, the operations performed in each of the subroutines os steps #004 and #007 will be described. First, the subroutine for determination of the value of Nf using the current-voltage conversion circuit 20 will be described with reference to FIG. 6. Upon initiating the sub-routine for the distance measurement in the current-voltage conversion circuit 20, the CPU 70 switches the switch 4 to the current-voltage conversion circuit 20 side (terminal 4a) (#101). The CPU 70 switches on the switch 55 to discharge any charge stored in the integrating capacitor 54, and then switches off the switch 55 after sufficiently discharging the charge (#102). Thereafter, the values of "0" and "10" are respectively substituted the values of Nf and the value n of the counter 73, and the switch 62 is switched to V1 (terminal 62a), and the input resistor 52 is selected by switching the switch 6 to terminal 6a (#103). Subsequently, it is judged whether or not the value Nf is above the predetermined number of times Nc (#104). If it is above the predetermined number of times Nc, the flag Ff in the RAM 71 is set, and the program returns to the main routine (#105).

Subsequently, light emission is initiated by the CPU 70 (#106) and upon standing by for a predetermined time T1 for stabilization (#107), the switch 6 is switched on (#108), and the integrating operation is performed for a predetermined time T2 (#109) during the timing of each pulse of light emission. During this time, a charge is stored in the integrating capacitor 54. Thereafter, the operation of the light emitting circuit 10 is stopped to end the light emitting operation, and the switch 6 is switched off to end the integrating operation (#110). The value n is added to the counter 73 (#111). The CPU 70 judges the level of the output voltage Vo (#112), and if it is H-level, the program goes to step #104. If it is low ("U") level, it is next judged whether the value n is equal to 1. If the value n is equal to 1, the CPU 70 returns to the main routine. If the value n is not equal to one, 1 is substituted as the value for n, the reference voltage is set to V2, the input resistor 53 is selected, and then the program goes to step #104 (#114).

Next, the sub-routine for the determination of the value Nn in the current-voltage conversion circuit 30 will be described with reference to FIG. 7. Upon initiating the subroutine for distance measurement in the current-voltage conversion circuit 30, the CPU 70 switches the switch 4 to the current-voltage conversion circuit 30 side (terminal 4b) (#201). The switch 55 is switched on to discharge any charge stored in the integrating capacitor 54, and then the switch 55 is switched off after sufficiently discharging the charge (#202). Thereafter, "0" and "10" are respectively substituted for the value Nn and the value n of the counter 73, then the switch 62 is switched to the V1 side (terminal 62a), and the input resistor 52 is selected by switching the switch 6 to terminal 6a (#203). It is then judged whether the value Nn is above the predetermined number of times Nc (#204). If it is above the predetermined number of times Nc, the flag Ff in the RAM 71 is set, and the program returns to the main routine (#205).

Subsequently, light emission is initiated by the CPU 70 (#206) and after standing by for a predetermined time T1 for stabilization (#207), the switch 6 is switched on (#208), and the integrating operation is performed for a predetermined time T2 (#209) during the timing of each pulse of light emission. During this time, a charge is stored in the integrating capacitor 54. Thereafter, the operation of the light emitting circuit 10 is stopped, ending the light emitting operation, the switch 6 is switched off ending the integrating operation (#210), and the value n is added to the counter 73 (#211). The CPU 70 judges the level of the output voltage Vo (#212), and if it is H-level, the program goes to step #204. If it is L-level, it is next judged whether the value n is equal to 1 (#213). If the value n is equal to 1, the CPU 70 returns to the main routine. If the value n is not equal to 1, 1 is substituted for the value of n, the reference voltage is set to V2, the input resistor 53 is selected, and then the programs goes to step #204 (#214).

The construction of the second embodiment of the present will now be described with reference to FIG. 8. A light emitting circuit 10 emits a distance measuring light beam to a subject. A PSD 3 receives reflected light from the subject, and outputs a signal corresponding to a light-received position to current-voltage conversion circuits 20 and 30. Both the current-voltage conversion circuits 20 and 30 are circuits for converting the output current of the PSD 3 to a corresponding voltage. One of these output signals is selected by a switch 4. The selected signal is amplified by an amplifying circuit 40, integrated by an integrating circuit 50 and then compared with a reference voltage by a level judgement circuit 60. The comparison result is output to a CPU 70. The CPU 70 performs data communication with a RAM 71, a ROM 72, a counter 73 and a counter 74, and outputs a driving signal Ve to the light emitting circuit 10 and a motor 75. The motor 75 drives a lens barrel 76.

Figure 8:
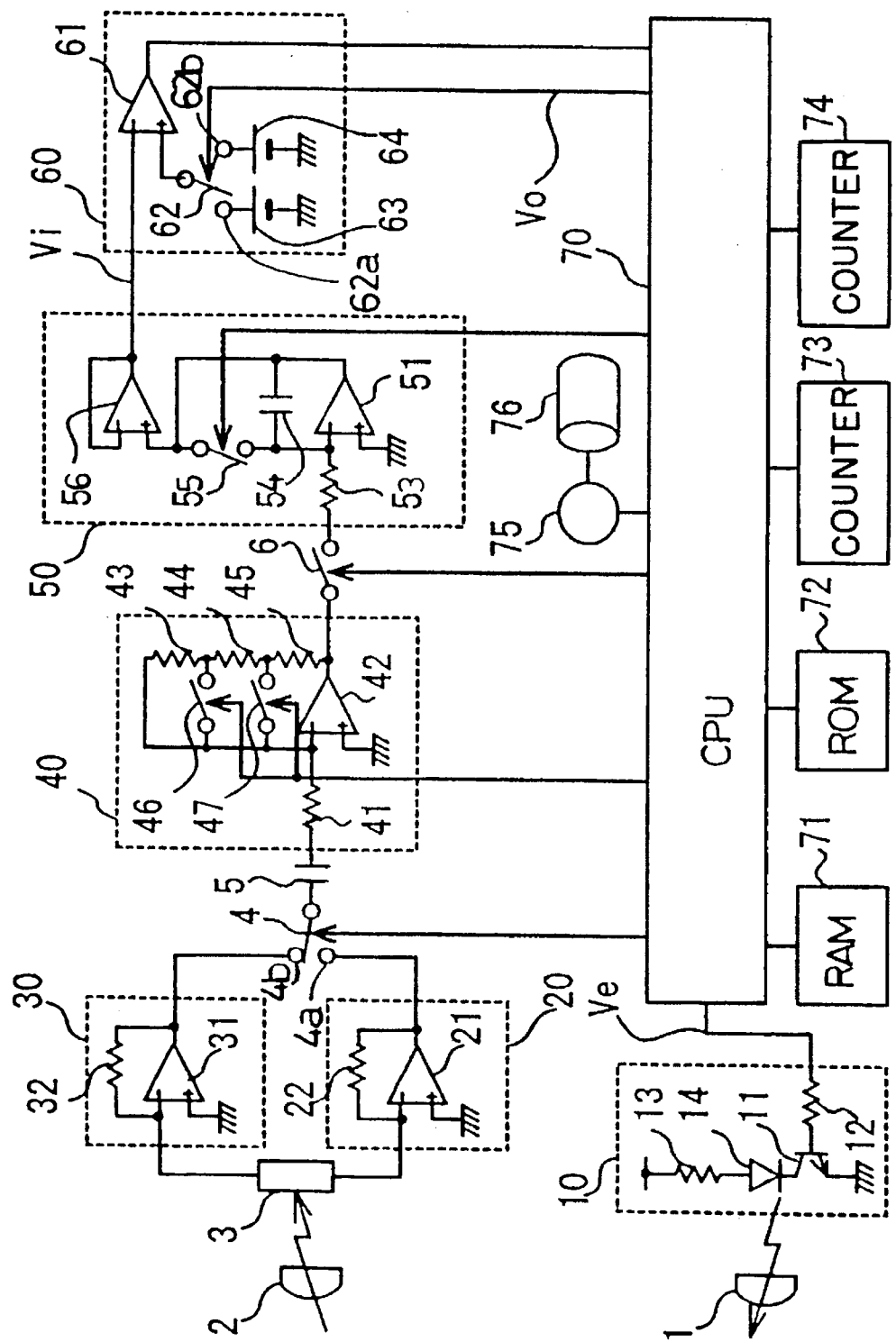
FIG. 8 is a schematic diagram showing a second embodiment of a distance measuring device in accordance with the present invention.

Upon partial depression of a well-known shutter release switch (not shown), a power source for all the circuits in FIG. 8 connected with the CPU 70 is switched on prior to a distance measuring operation. Subsequently, the CPU 70 clears the content of the RAM 71 and determines the gain of the amplifying circuit 40. The light emitting circuit 10 drives an IRED 14, and comprises a transistor 11, a base resistor 12, a current limiting resistor 13 and the IRED 14. When a pulsed light emitting signal is output from the CPU 70, the base resistor 12 drives the IRED 14, under the condition that the signal thereof is a high ("H") level, and the IRED 14 emits light. The emitted light is focused by a light emitting lens 1, and projected toward the subject (not shown). The light which is reflected from the subject is focused again by a light receiving lens 2 and enters the PSD 3.

The current-voltage conversion circuits 20 and 30 each constitute a light receiving circuit in combination with the PSD 3. Upon the incidence of a light signal to the PSD 3, the PSD 3 outputs a current corresponding to the intensity and angle of incidence of the light signal to the current-voltage conversion circuit 20 and the current-voltage conversion circuit 30. The current-voltage conversion circuit 20 comprises an amplifier 21 and a feedback resistor 22, and outputs a voltage which is proportional to an input current. Likewise, the current-voltage conversion circuit 30 comprises an amplifier 31 and a feedback resistor 32, and outputs a voltage which corresponds to an input current.

The switch 4 serves to transmit the output of either one of the current-voltage conversion circuit 20 or the current-voltage conversion circuit 30 to a subsequent stage of the circuit, and the state thereof is controlled by the CPU 70. The switch 4 is switched to the current-voltage conversion circuit 20 when distance measurement is carried out using a signal from a terminal of the PSD 3 which becomes larger when the subject is located at a relatively far distance. The current-voltage conversion circuit 30 is used when distance measurement is carried out using a signal from another terminal of the PSD 3 which becomes larger when the subject is located at a relatively near distance. The amplifying circuit 40 is a variable gain amplifying circuit having a gain which is selectively switchable. A coupling capacitor 5 is connected to the front of the amplifying circuit 40, and a DC component of an input signal is attenuated by the capacitor 5. The amplifying circuit 40 comprises an amplifier 41 and two feedback resistors 43,44, and serves to amplify the input signal at a constant, selectable gain. Two switches, a switch 46 and a switch 47, are provided in the circuit, and the on/off operation of these switches is controlled by the CPU 70. The switches 46 and 47 perform the on/off operation of the feedback resistors 43 and 44 respectively, so that the gain of the amplifier 41 is varied stepwise in accordance with the state of these switches. Accordingly, amplification of the signal is performed in accordance with the stepwise varying gain, and the amplified signal is output to the integration circuit 50 at the next stage. The amplifying circuit 40 performs inversion amplification, so that the polarity of the output voltage is opposite that of the voltage of the power source.

The integration circuit 50 comprises the amplifier 51, the input resistor 52, an integrating capacitor 54, a switch 55 and a voltage follower 56, and serves to perform time integration on an input voltage. Prior to an integrating operation, the switch 55 is switched on to discharge any charge remaining in the integrating capacitor 54. The switch 55 is switched off after sufficient discharge has occurred. Upon initiation of the integrating operation by the switching-on of the switch 6, the integrating capacitor 54 stores the time-integration value of an input signal in the form of a charge. At the same time, the voltage across the terminals of the integrating capacitor 54 is output to a comparator 61. Upon completion of the integrating operation, the switch 6 is switched off (terminal 6c).

A level judgement circuit 60 comprises the comparator 61, a first reference power source 63 and a second reference power source 64. The level judgement circuit 60 judges the level of the input voltage. The comparator 61 compares an integration voltage Vi with the voltage Vf of the reference power source 64 which is selected by the switch 62, and outputs to the CPU 70 a digital signal output voltage Vo which is H-level when the integration voltage Vi is higher, and L-level when the integration voltage Vi is lower.

Figure 11:
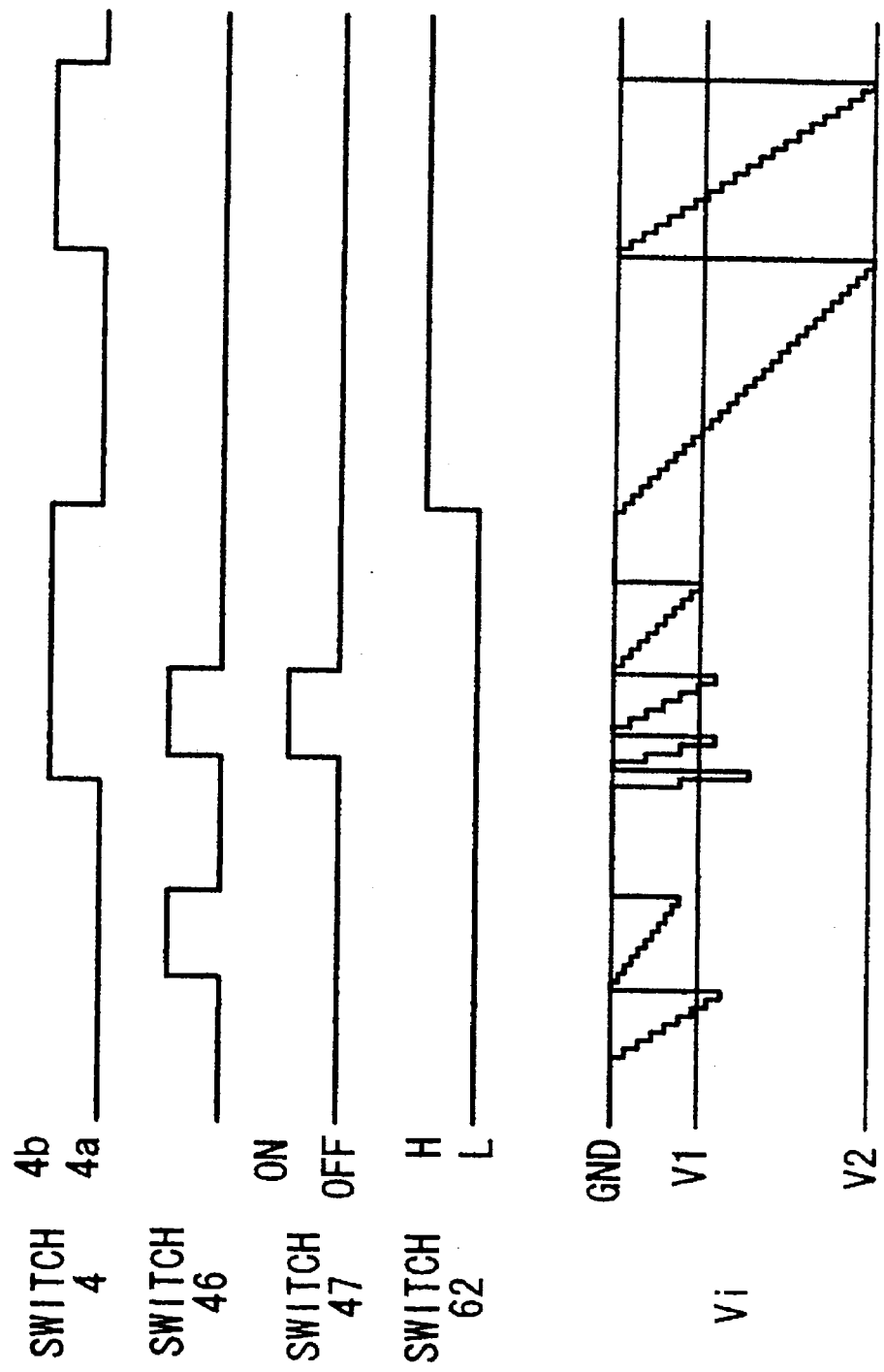
FIG. 11 is a diagram showing a series of operations during the distance measurement time.
Figure 12:
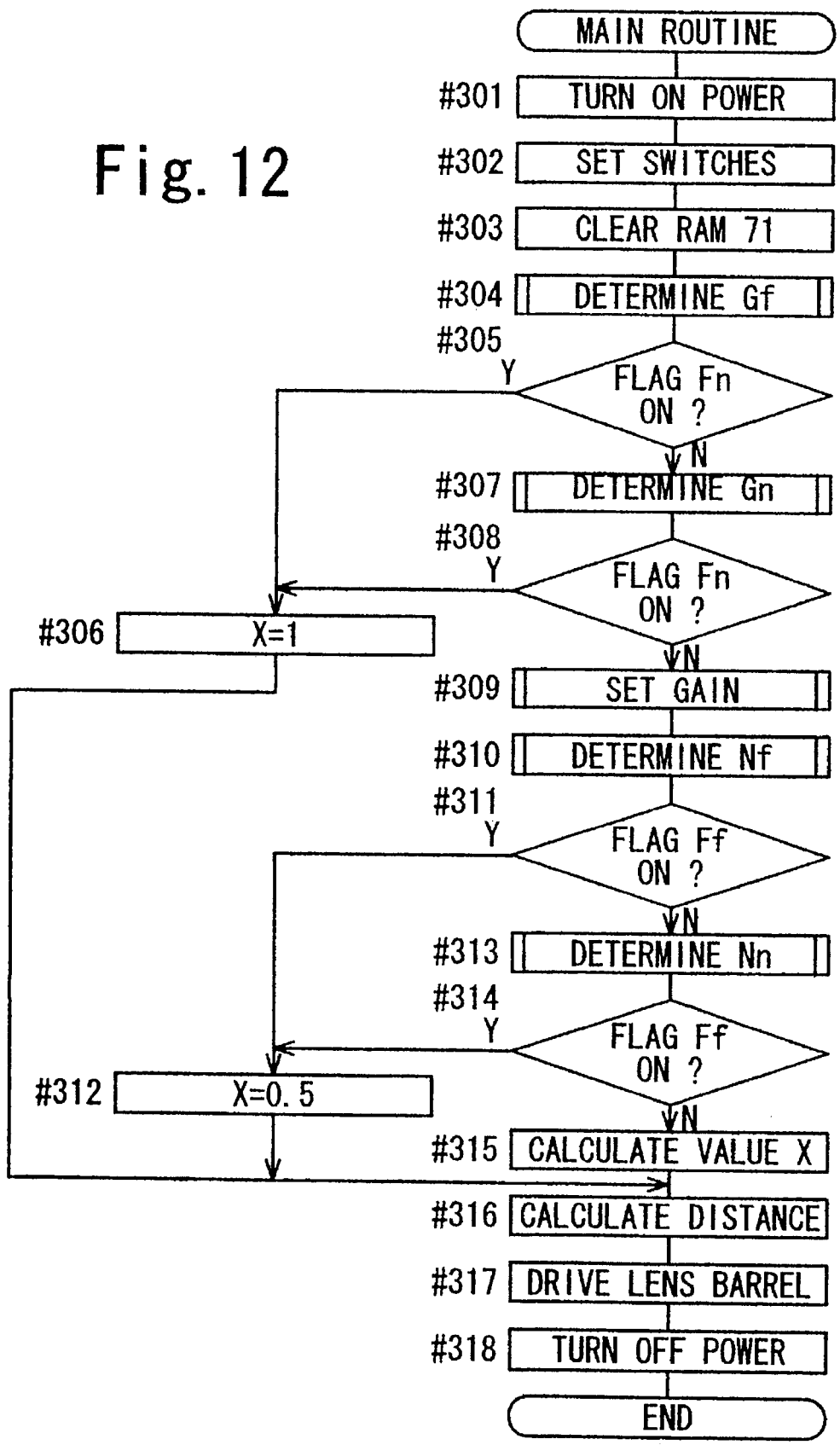
FIG. 12 is a flowchart showing the operation of the second embodiment shown in FIG. 8.

Upon beginning the distance measuring routine, the power source (not shown) for all the circuits in FIG. 8 is switched on. Subsequently, the CPU 70 clears the contents of the RAM 71, and the gain of the amplifying circuit 40 is determined by a method to be described later. During the gain determining operation, when reflected light from the subject is very large a "closest" flag is set in the RAM 71, and in this case the CPU 70 judges the distance to be "closest" without performing distance measurement. Thereafter, distance measurement is performed using the current-voltage conversion circuit 20, and a value Nf is stored in the RAM 71. When the reflected light from the subject is very slight during the distance measuring operation, an "infinite" flag is set in the RAM 71, and in this case the CPU 70 judges the distance to be "infinite" without performing distance measurement. Subsequently, distance measurement is performed using the current-voltage conversion circuit 30, and a value Nn is stored in the RAM 71. Upon completion of the distance measuring operation as described above, the CPU 70 judges an "infinite" distance if the infinite flag is set, and judges a "closest" distance if the closest flag is set. If neither the infinite flag nor the closest flag are set, the value of X is calculated using the values of Nf and Nn which are stored in the RAM 71. Upon determination of the value of X, as shown in FIG. 4, the CPU 70 refers to an address of the ROM 72 which is determined by the value of X to thereby determine the distance to the subject, and the motor 75 is controlled to drive the lens barrel 76 to bring the subject into focus. Finally, the CPU 70 switches off the power source for all the circuits in FIG. 8. FIG. 11 shows the state of the switches 4, 46, 47 and 62, as well the state of voltage V1 and V2 during the distance measuring operation.

Figure 9:
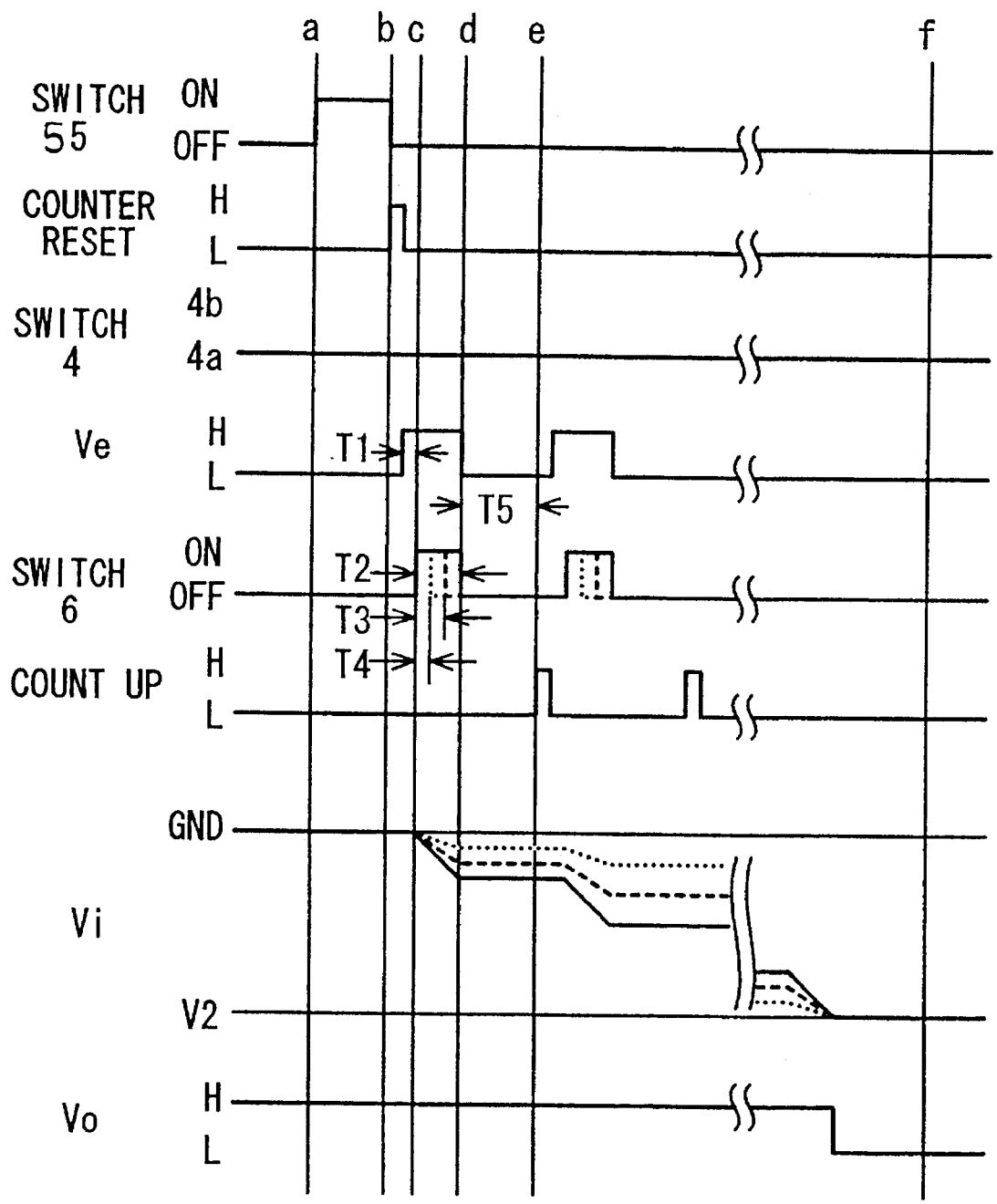
FIG. 9 is a diagram showing an integrating operation of the second embodiment shown in FIG. 8.

Next, the operation for determining the gain of the amplifying circuit 40 will be described with reference to FIGS. 9 and 10. First, the switch 4 is switched to the current-voltage conversion circuit 20 side (terminal 4a) by the CPU 70. The switch 62 is switched to terminal 62a (the reference power source 63 side), and the switch 55 is switched on. This operation corresponds to the condition shown in cell a of FIG. 10. Any charge stored in the integrating capacitor 54 is discharged, (see timing "a" shown in FIG. 9), and after sufficiently discharging the charge, the switch 55 is switched off and the value Nf in the counter 73 is cleared to 0 (see timing "b" shown in FIG. 9). The CPU 70 actuates the light emitting circuit 10 to start light emission. In order to ensure the appropriate rise time for each amplifier and to reduce the effect of power source fluctuation at the start of light emission, the integration circuit is actuated for a time T2 (for example, 64 microseconds) after a time T1 (for example, 36 microseconds) elapses during each pulse of light emission. After this operation is completed, light emission and integration are stopped, and the CPU 70 stands by for time T5 and adds 1 to the counter 1.

After repeating this operation for a predetermined frequency Nc (for example, 10 times), the switch 6 is switched off (terminal 6c) to output a voltage between the terminals of the integrating capacitor 54, that is, the integration voltage Vi to the comparator 61. The comparator 61 compares this voltage with the voltage V1 of the reference power source 63, converts the comparison result into a digital signal and outputs it to the CPU 70. The CPU 70 switches the switch 46 to on if the output of the comparator 61 is H-level. This corresponds to the condition of cell b shown in FIG. 10 and the gain in this case is half that of a previous light emitting operation. Subsequently, the integrating operation and the comparison operation are repeated in the same manner as described above, and if the output of the comparator 61 is H-level, the switch 47 is switched on. This corresponds to the condition shown in cell c of FIG. 10. The gain in this case is a quarter of that in the previous light emitting operation. If the output of the comparator 61 is H-level although all switches are switched on, the gain cannot be set to a smaller value since there are no additional paths available. In the present invention, however, control of the integration time by the CPU 70 permits the distance measuring device of this embodiment to simulate a variable gain of the amplifying circuit. Therefore, to obtain greater sensitivity, the integration time is changed. Therefore, the integration time within the one light emitting operation time is set to be a time T3 (in this case, 8 microseconds), which is one eighth of the time T2. To set the equivalent gain to one eighth, the switches 46 and 47 are opened, and the same processing is performed as above. This corresponds to the condition shown in cell d of FIG. 10.

The gain in this case can be set to one eighth, one sixteenth and one thirty-second of the gain in the first light emitting operation, and these correspond to the conditions shown in cells d, e and f of FIG. 10. The operation of the switch 6 is shown by a broken line in FIG. 9. If the output of the comparator 61 is H-level irrespective of the above, the integration time during one light emission time is set to a time T4 (in this case, one microsecond), which is one sixty-fourth of the time T2. To set the equivalent gain to one sixty-fourth, the switches 46 and 47 are opened, and the same processing is performed. The gain in this case can be set to one sixty-fourth, one one-hundred-and-twenty-eighth and one two-hundred-and-fifty-sixth of the gain in the first light emitting operation, and these correspond respectively to the conditions shown in cells g, h and i of FIG. 10. The operation of the switch 6 is shown by a broken line in FIG. 9. In a case where the output of the comparator 61 is still H-level although the integration time during one light emission time is a time T4 and both of the switches 45 and 47 are switched on, it is judged that the reflected light from the subject is very large and the subject is located at the closest distance, the closest flag is set and the CPU 70 passes over this routine. In other cases, any one of the gains shown in cells a–i of FIG. 10 is finally selected, and this condition is stored at a suitable address in the RAM 71.

The same operation as described above is also performed using the current-voltage conversion circuit 30, and any of the gains shown in cells a–i of FIG. 10 which is finally obtained is compared with the gain which is obtained by the gain determining operation using the current-voltage conversion circuit 20 to set the switches 46 and 47 of the amplifying circuit, and the integration time is dependent on the smaller determined gain, thus resulting in a more rapid measurement.

Figure 13A:
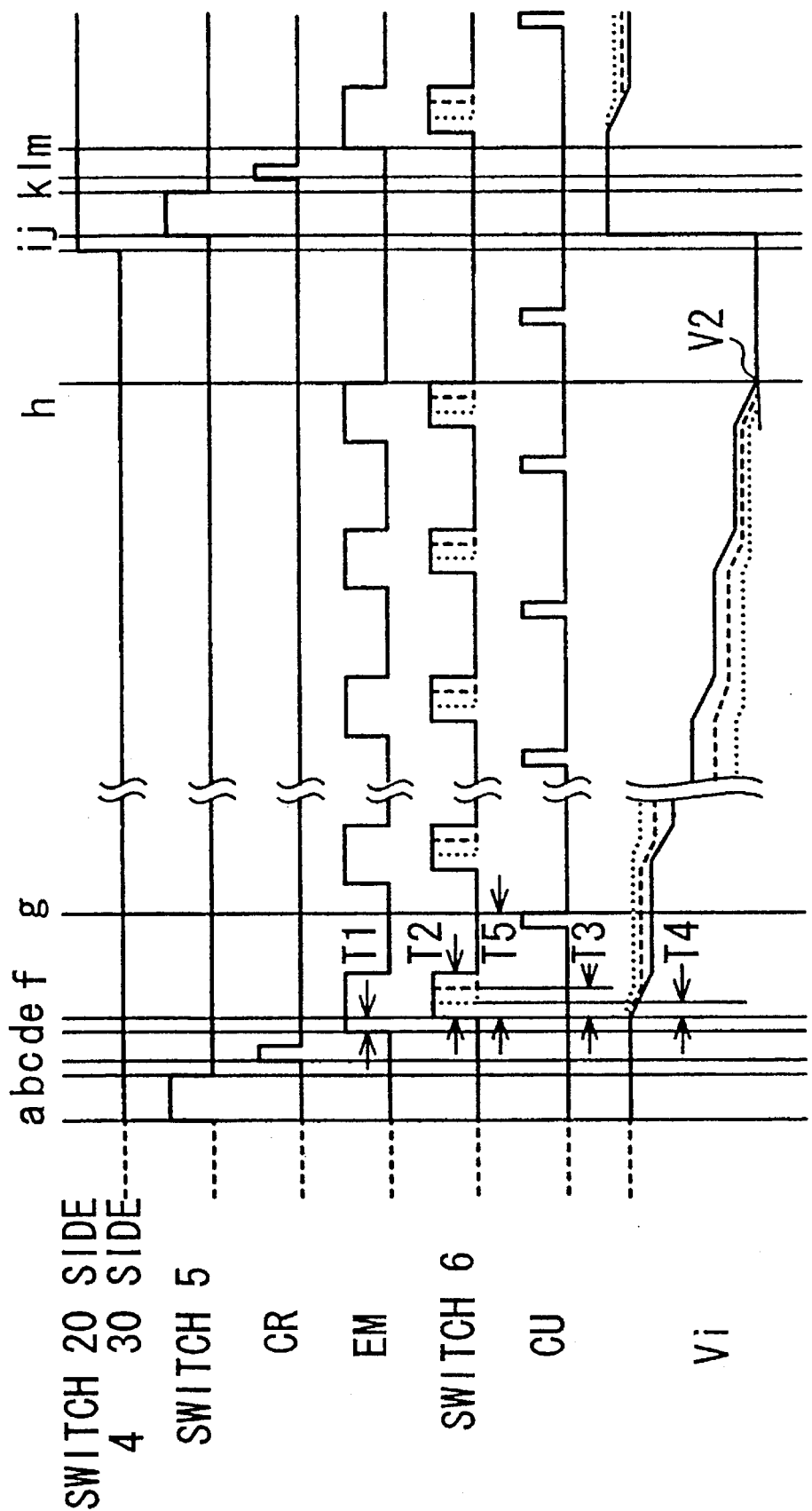
FIG. 13(a) is a timing diagram showing the various waveforms during the subroutine for gain determination.
Figure 13B:
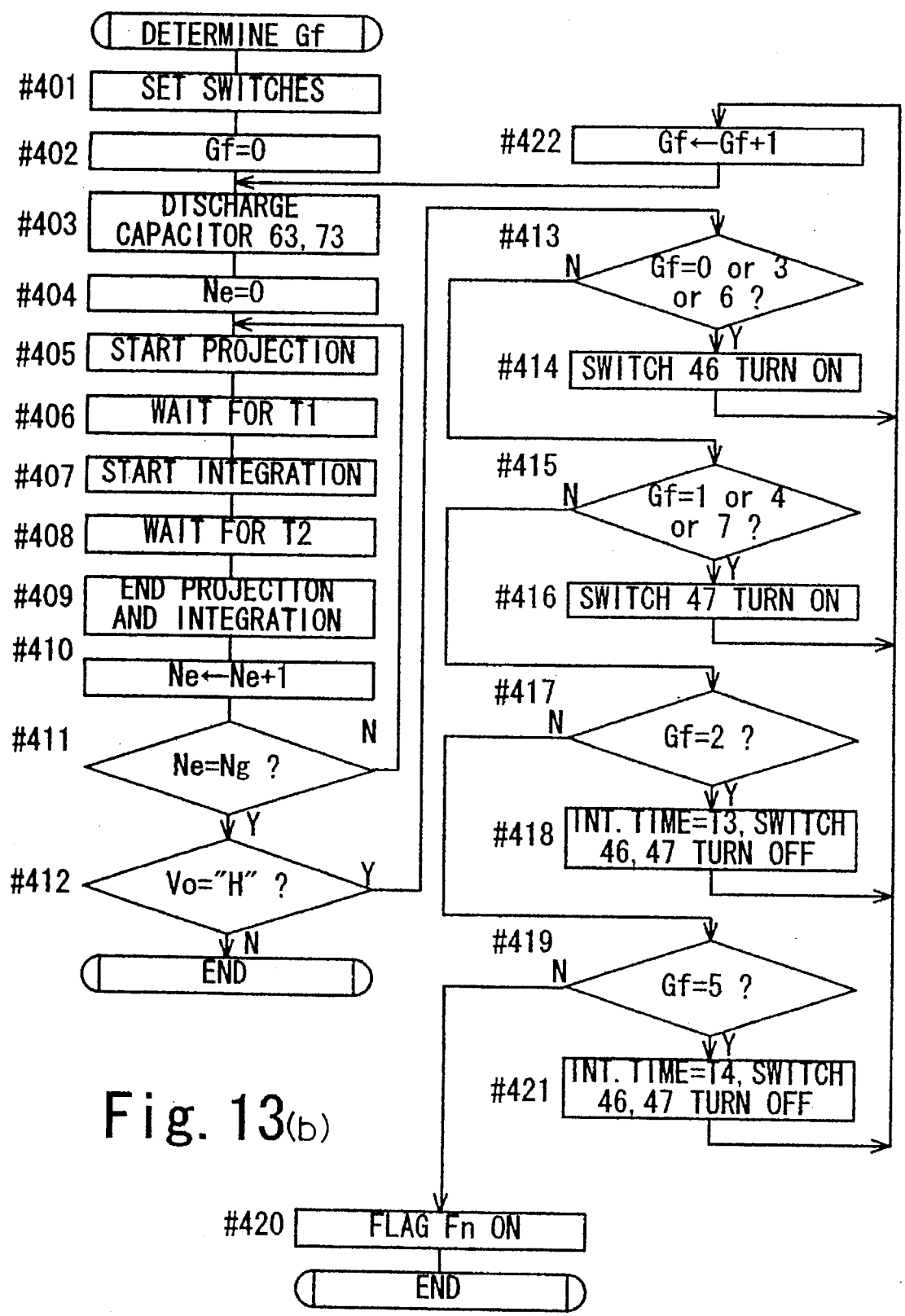
FIG. 13(b) is a flowchart showing a sub-routine for gain determination.

Next, the distance measurement using the current-voltage conversion circuit 20 will be described with reference to the timing diagram of FIG. 13(a). First, the switch 4 is switched to the current-voltage conversion circuit 20 side (terminal 4a). Subsequently, the switch 55 is switched on to discharge any charge stored in the integrating capacitor 54. After sufficiently discharging the charge, the switch 55 is switched off, and the value Nf in the counter 73 is cleared to zero. The switch 62 is switched to the reference power source 64 (terminal 62b) to start distance measurement by the current-voltage conversion circuit 20. The distance measuring method is shown in FIG. 13(a). The value Nf is subjected to an addition operation while repeating the light emitting operation, and the light emitting operation is ended when the integration voltage Vi reaches the voltage V2 of the reference power source 64. If the integration voltage Vi does not reach the voltage V2 even by means of the light emitting operation at a predetermined frequency or number of times Nc because the subject is located at a farther distance and the reflected light from the subject is very small, it is judged that the subject is located at an infinite distance, so that the infinite flag is set in the RAM 71. Otherwise, the value Nf remaining in the counter 73 when distance measurement is completed is stored in the RAM 71, and the CPU 70 passes out of this routine.

Distance measurement by the current-voltage conversion circuit 30 is substantially similar. First, the switch 54 is switched on to discharge the charge stored in the integrating capacitor 54. After sufficiently discharging the charge, the switch 55 is switched off, and the value Nn in the counter 74 is cleared to zero. The distance measuring method is also as shown in FIG. 13(a). The value Nn is subjected to an addition operation while iteratively repeating the light emitting operation, and the light emitting operation is completed when the integration voltage Vi reaches V2. The value Nn remaining in the counter 74 when the distance measurement is completed is stored in a suitable address of the RAM 71, and the CPU 70 passes over this routine.

The operation of this embodiment of the present invention will now be described with reference to the flowcharts shown in FIGS. 12 to 16. First, the main routine will be described with reference to FIG. 12. At the start of the distance measurement operation, the CPU 70 switches on the power source for the whole distance measuring circuit (#301), next, switch 4 is turned to the terminal 4a side, switch 6 is turned to off, switch 55 is turned on to discharge the capacitor 54 and is then turned off, switch 62 is turned to the reference voltage source 63 side (#302), and the CPU 70 clears the content of RAM 71 (#303). Subsequently, the appropriate gain of the amplifying circuit 40 is determined using the current-voltage conversion circuit 20 in accordance with the process described above, and the gain Gf is stored in a suitable address of RAM 71 (#304). The state of the flag Ff is checked, and the program goes to step #306 if the flag Ff is set (#305). In this case, 1 is substituted for the value X (#306). Likewise, gain determination of the amplifying circuit 40 is performed using the current-voltage conversion circuit 30, and the value Gn is stored in the RAM 71 (#307). At the same time, the state of the flag Ff is checked, and the program goes to #306 if the flag Ff is set (#308). In this case, 1 is substituted for the value X (#306). The CPU 70 compares the values Gf and Gn, and selects the smaller gain so as to provide higher precision distance measurement (#309). Thereafter, distance measurement is performed using the current-voltage conversion circuit 20, and the value Nf is stored in the RAM 71 (#310). At the same time, the state of the flag Ff is checked, and the program goes to #312 if the flag Ff is set (#311). In this case, 0.5 is substituted for the value X. Likewise, distance measurement using the current-voltage conversion circuit 30 is performed, and the value Nn is stored in the RAM 71 (#313). At the same time, the state of the flag Ff is checked, and the program goes to #312 if the flag Ff is set (#314). In this case, 0.5 is also substituted for the value of X. The values Nf and Nn which are stored in the RAM 71 in the sub-routines #310 and #313 are read out to calculate the value of X (#315). If the flag Ff is set, the distance is judged as infinite, otherwise, as shown in FIG. 4, an address of the ROM 72 which is determined according to the value of X, for example, by using a ROM look-up table, is referred to in order to calculate the distance to the subject (#316). Finally, the CPU 70 drives the lens barrel 76 corresponding to the distance (#317). The CPU 70 then switches off the power source for the whole distance measuring circuit (#318), and the CPU 70 passes out of this routine.

Next, the operation in each sub-routine will be described. First, the sub-routine for Gf determination by the current-voltage conversion circuit 20 will be described with reference to FIG. 13(b). Upon initiating the sub-routine for Gf determination using current-voltage conversion circuit 20, the CPU 70 switches the switch 4 to the current-voltage conversion circuit 20 side (terminal 4a) and turns the switches 46 and 47 off (#401). After Gf is cleared to 0 (#402), the CPU 70 switches on the switch 55 to discharge any charge stored in the integrating capacitor 54, and then switches off the switch 54 after sufficiently discharging the charge (#403). Thereafter, a variable Ne is cleared to 0 (#404).

Subsequently, light emission is begun by the CPU 70 (#405) and after standing by for a predetermined time T1 for stabilization (#406), the switch 6 is switched on (#407), and the integrating operation is performed for a time T2 (#408). During this time, a charge is stored in the integrating capacitor 54. Thereafter, the operation of the light emitting circuit 10 is stopped to end the light emitting operation, the switch 6 is switched off to end the integrating operation (#409), and the value 1 is added to the counter 73 (#410). The CPU 70 judges whether the value Ne is equal to the predetermined value Ng (which is a value similar to Nc described above) (#411), and if it is not equal, the program goes to step #405. If it is equal, the level of the output voltage Vo is judged (#412), and if it is L-level, the CPU 70 returns to the main routine.

If the output voltage Vo is H-level, the CPU 70 judges whether the value Gf is equal to 0, 3, or 6 (#413), and if this condition is satisfied, the CPU 70 turns the switch 46 on. If it is not satisfied, the CPU 70 judges whether the value Gf is equal to 1, 4, or 7 (#415), and if this condition is satisfied, the CPU 70 turns the switch 47 on (#416). If it is not satisfied, the CPU 70 judges whether the value Gf is equal to 2 (#417), and if it is equal to 2, the CPU 70 sets the time T3 as the integration time and turns the switches 46,47 off (#418). If it is not equal to 2, the CPU 70 judges whether the value of Gf is equal to 5 (#419), and if it is not equal to 5, the CPU 70 sets flag Fn and returns to the main routine (#420). If it is equal to 5, the CPU 70 sets the time T4 as the integration time and turns the switches 46,47 off (#421).

If the program reaches step #414, #416, #418, or #421, the CPU 70 adds 1 to the value Gf and the program goes to #403 (#422).

Figure 14:
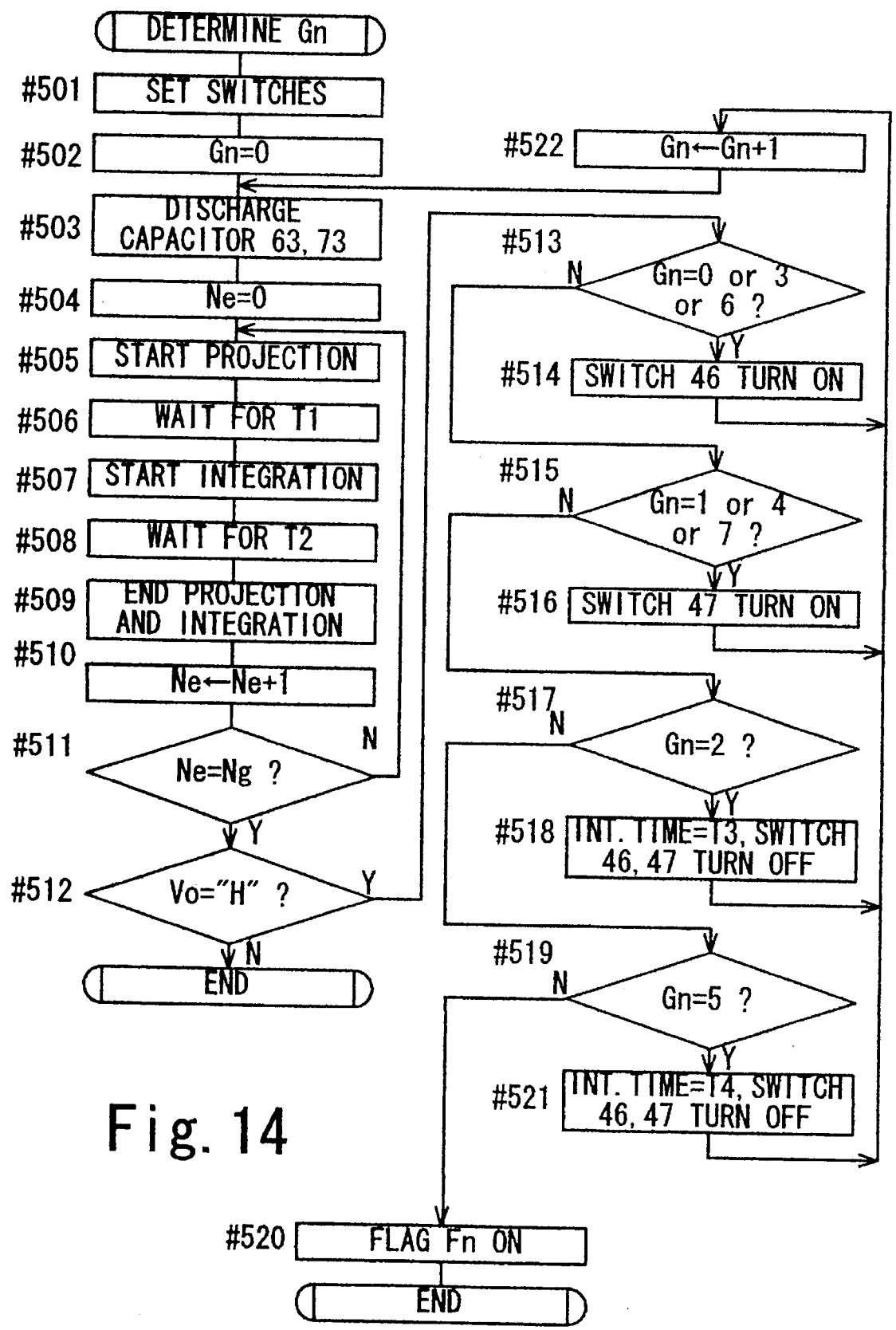
FIG. 14 is a flowchart showing a sub-routine for determining a value Gf.
Figure 15:
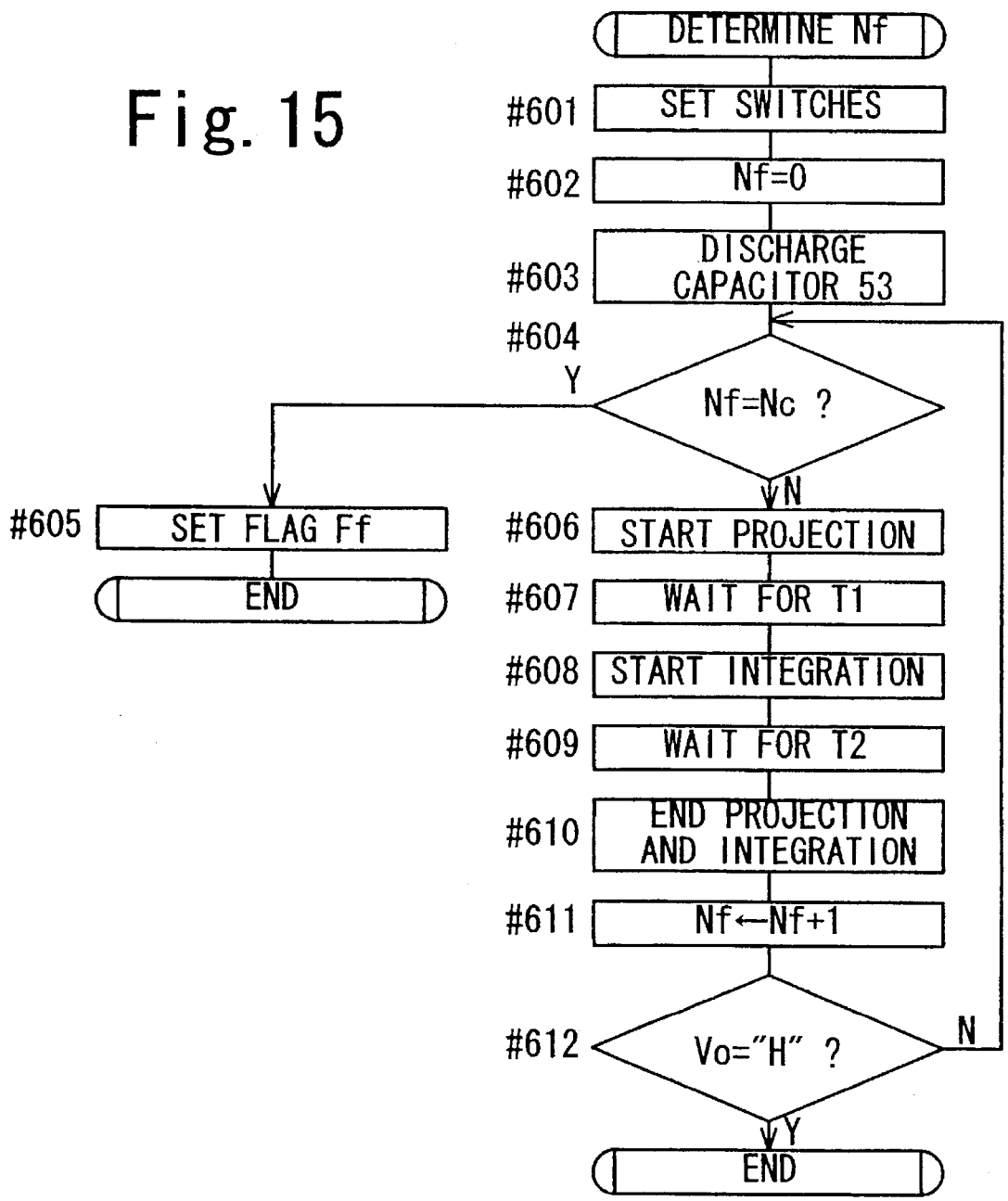
FIG. 15 is a flowchart showing a sub-routine for determining a value Nf.

Next, the sub-routine for determination of the value Gn by the current-voltage conversion circuit 30 will be described with reference to FIG. 14. Upon initiating the sub-routine for Gf determination using the current-voltage conversion circuit 30, the CPU 70 switches the switch 4 to the current-voltage conversion circuit 30 side (#501). After Gn is cleared to 0 (#502), the CPU 70 switches on the switch 55 to discharge any charge stored in the integrating capacitor 54, and then switches off the switch 55 after sufficiently discharging the charge (#503). Thereafter, Ne is cleared to 0 (#504).

Subsequently, light emission is begun by the CPU 70 (#505) and after standing by for a time T1 (#506), the switch 6 is switched on (#507), and the integrating operation is performed for a time T2 (#508). During this time, a charge is stored in the integrating capacitor 54. Thereafter, the operation of the light emitting circuit 10 is stopped to end emitting operation, the switch 6 is switched off to end the integrating operation (#509), and the value 1 is added to the counter 73 (#510). The CPU 70 judges whether the value Ne is equal to the predetermined value Ng (#511), and if it is not equal, the program goes to step #505. If it is equal, the level of the output voltage Vo is judged (#512), if it is L-level, the CPU 70 returns to the main routine.

If the output voltage Vo is H-level, the CPU 70 judges whether the value Gn is equal to 0, 3, or 6 (#513), and if this condition is satisfied, the CPU 70 turns the switch 46 on. If it is not satisfied, the CPU 70 judges whether the value Gn is equal to 1, 4, or 7 (#515), and if this condition is satisfied, the CPU 70 turns the switch 47 on (#516). If it is not satisfied, the CPU 70 judges whether the value Gn is equal 2 (#517), and if it is equal to 2, the CPU 70 sets the time T3 as the integration time and turns the switches 46,47 off (#518). If it is not equal to 2, the CPU 70 judges whether the value Gn is equal to 5 (#519), and if it is not equal to 5, the CPU 70 sets the flag Fn and returns to the main routine (#520). If it is equal to 5, the CPU 70 sets the time T4 as the integration time and turns the switches 46,47 off (#521).

If the program reaches step #514, #516, or #521, the CPU 70 adds 1 to the value Gn and the program goes to step #503 (#522).

Next the operation in each sub-routine will be described. First the sub-routine for Nf determination by the current-voltage conversion circuit 20 will be described with reference to FIG. 15. After initiating the sub-routine for distance measurement using the current-voltage conversion circuit 20, the CPU 70 switches the switch 4 to the current-voltage conversion circuit 20 side (terminal 4a) (#601). Next, the CPU 70 clears the value Nf to 0 (#602), and switches on the switch 55 to discharge any charge stored in the integrating capacitor 54, and then switches off the switch 55 after sufficiently discharging the charge (#603). Subsequently, it is judged whether the value Nf is above the predetermined number of times Nc (#604). If it is above the predetermined number of times Nc, the flag Ff in the RAM 71 is set, and the program returns to the main routine (#605).

Subsequently, light emission is begun by the CPU 70 (#606) and upon standing for a time T1 for stabilization (#607), the switch 6 is switched on (#608), and the integrating operation is performed for a time T2 (#609). During this time, a charge is stored in the integrating capacitor 54. Thereafter, the operation of the light emitting circuit 10 is stopped to end the light emitting operation (#610), 1 is added to the value Nf (#611), the CPU 70 judges the level of the output voltage Vo (#612), and if it is L-level, the program goes to #604. If it is H-level, the CPU 70 returns to the main routine.

Figure 16:
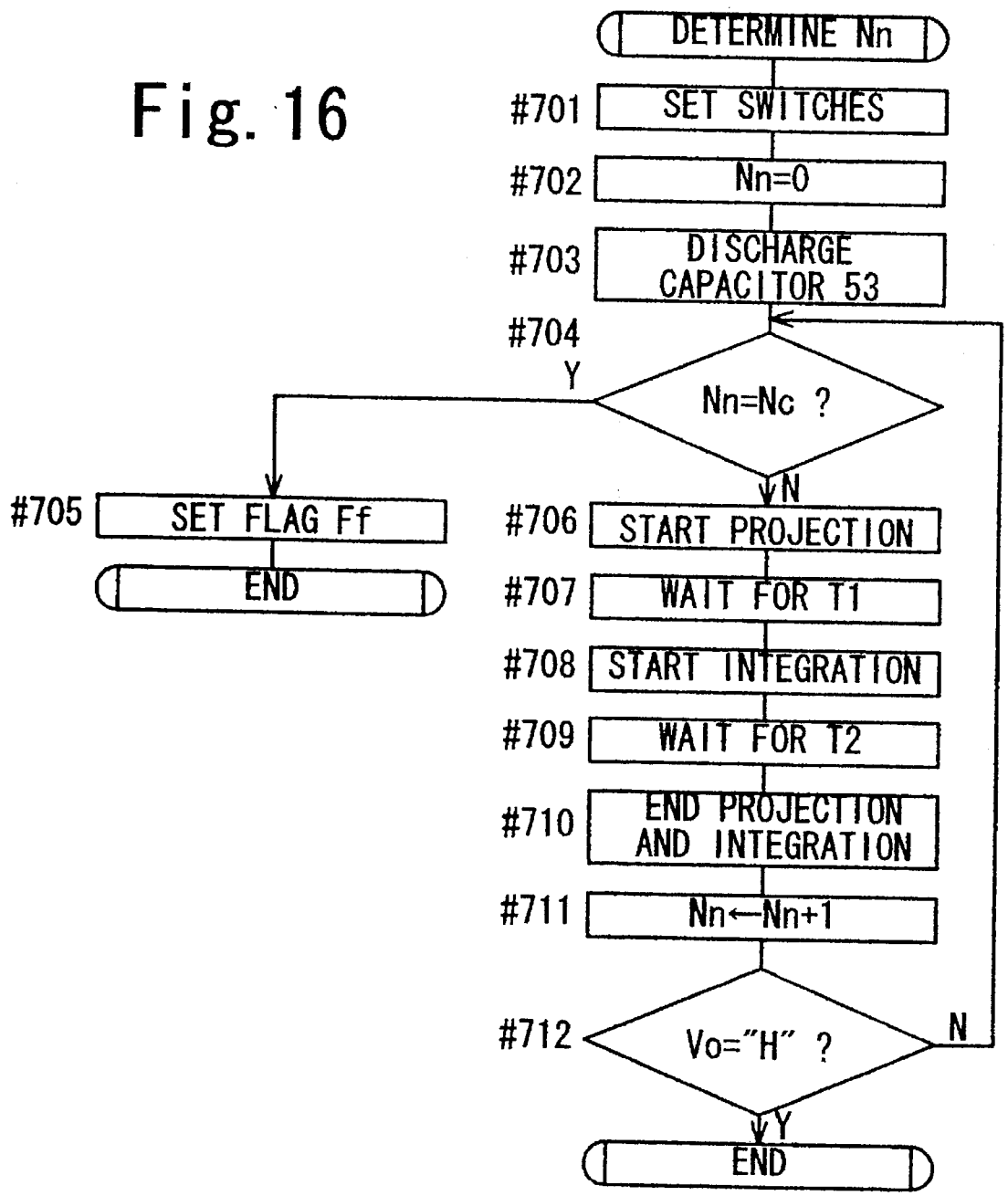
FIG. 16 is a flowchart showing a sub-routine for determining a value Nn.

Next, the sub-routine for Nf determination by the current-voltage conversion circuit 30 will be described with reference to FIG. 16. Upon initiating the sub-routine for distance measurement in the current-voltage conversion circuit 30, the CPU 70 switches the switch 4 to the current-voltage conversion circuit 30 side (terminal 4b) (#701). Next, the CPU 70 clears the value Nn to 0 (#702), and switches on the switch 55 to discharge any charge stored in the integrating capacitor 54, and then switches off the switch 55 after sufficiently discharging the charge (#703). Subsequently, it is judged whether the value Nn is above the predetermined number of times Nc (#704). If it is above the predetermined number of times Nc, the flag Ff in the RAM 71 is set, and the program returns to the main routine (#705).

Subsequently, light emission is begun by the CPU 70 (#706) and after standing by for a time T1 for stabilization (#707), the switch 6 is switched on (#708), and the integrating operation is performed for a time T2 (#709). During this time, a charge is stored in the integrating capacitor 54. Thereafter, the operation of the light emitting circuit 20 is stopped to end the light emitting operation, the switch 6 is switched off to end the integrating operation (#710), and 1 is added to the value Nn (#711), the CPU 70 judges the level of the output voltage Vo (#712), and if it is L-level, the program goes to #704. If it is H-level, the CPU 70 returns to the main routine.

According to the construction of this invention, the output signal of the light receiving device is integrated and compared with a specific voltage, and the input resistance of the integration circuit is switched in accordance with the level, so that the distance measuring time can be shortened without reducing distance measuring precision.

Moreover, according to the construction of the second embodiment, the distance to the subject is calculated using farther side and nearer side light emission times without converting the voltage between the terminals of the integrating capacitor to a digital signal, so that high precision distance measurement can be performed by a simple and low-cost circuit.

Further, the integration time is set to be a variable to thereby simulate and obtain the same effect as changing the gain setting, so that a fine gain setting can be performed by a combination of the gain setting circuit and the variable integration time, and thus the reduction in distance measurement precision accompanied by foregoing the inclusion of an adequate number of selectable gains, which has been a disadvantage in the prior art, can be eliminated.

We claim:

1. A distance measuring device, comprising: light emitting means for emitting a light projected to reflect off a subject; light receiving means for receiving reflected light from the subject and for providing a corresponding output signal; variable-gain amplifying means for amplifying the output signal and for providing an amplified output signal; integrating means for integrating the amplified output signal and for producing an integrated output signal; comparing means for comparing the integrated output signal to a first predetermined value and a to a second predetermined value, the second predetermined value being higher than the first predetermined value; switching means for switching the gain of the amplifying means when the integrated output signal is higher than the first predetermined value; and calculating means for calculating a distance to the subject in accordance with the number of times integration is performed until the integrated output signal exceeds the second predetermined value.

2. A distance measuring device according to claim 1; wherein the light is a pulsed infrared light beam.

3. In an electronic camera of the type having a motor for driving a lens barrel to achieve automatic focus of a lens in response to the partial depression of a shutter release button, a distance measuring device according to claim 1, wherein the distance measuring device has an output for driving the motor in accordance with the calculated distance so that the subject is brought into proper focus.

4. A distance measuring device according to claim 1; wherein the light receiving means comprises a light receiving element for producing at least one current signal in response to incident light and a current-voltage conversion means for converting an output current signal of the light receiving element into a corresponding voltage signal.

5. A distance measuring device, comprising: light emitting means for emitting light projected to reflect off a subject; light receiving means for receiving reflected light from the subject; amplifying means for amplifying an output signal of the light receiving means; integrating means for integrating an output signal of the amplifying circuit; a first reference voltage source for generating a first predetermined voltage; a second reference voltage source for generating a second predetermined voltage higher than the first predetermined voltage; comparing means for comparing a voltage level of an output signal of the integrating means with the first predetermined voltage until the output signal of the integrating means exceeds the first predetermined voltage and then comparing the output signal of the integrating means with the second predetermined voltage until the output signal of the integrating means exceeds the second predetermined voltage; switching means for switching a gain of the amplifying means when the output of the integrating means exceeds the first predetermined voltage level; and calculating means for calculating a distance to the subject depending on a number of times the integrating means integrates until the output of the integrating means reaches the second predetermined voltage.

6. A distance measuring device according to claim 5; wherein the light is a pulsed infrared light beam.

7. A distance measuring device according to claim 5; wherein the switching means for switching a gain of the amplifying means includes means for switching an input resistance value of the integrating means.

8. A distance measuring device according to claim wherein the switching means for switching a gain of the amplifying means includes means for switching an integration time.

9. A distance measuring device according to claim 8; wherein the switching means includes means for switching the integration time depending on a saturation value of the amplifying circuit.

10. A distance measuring device, comprising: emitting means for emitting a pulsed light beam comprising a series of light pulses projected to be reflected from a subject; receiving means for receiving reflected light from a subject; integrating means for generating an integrated value by performing an integrating operation integrating an integration input signal dependent on the reflected light received from the subject during each light pulse of the series of light pulses, the integrating operation being performed until one of the integrated values reaches a second predetermined level; switching means for switching a level of the integration input signal depending on the integrated value so that when the integrated value is below a first predetermined value the level of the integration input signal results in a relatively fast increase in the integrated value and when the integrated value is above the first predetermined level, the level of the integration input signal results in a relatively slow increase in the integrated value so that an output of the receiving means is integrated with a relatively lower precision before the integrated value reaches the first predetermined level and is then integrated with a relatively higher precision after the integrated value reaches the first predetermined value; and calculating means for calculating a distance to the subject depending on a number of times the integrating operation is performed before one of the integrated value reaches the second predetermined level.

11. A distance measuring device according to claim 10; wherein the switching means includes means for switching the level of the integration input signal by switching an input resistance of the integrating circuit.

12. A distance measuring device according to claim 10; wherein the switching means includes means for switching the level of the integration input signal by switching an integration time of the integrating operation.

13. A distance measuring device according to claim 10; further comprising amplifying means for amplifying an output signal from the receiving means to produce an amplified output signal; and wherein the integrating means includes means for generating an integrated value by performing an integrating operation integrating the integration input signal depending on the amplified output signal; and the switching means includes means for switching the level of the integration input signal by switching a gain of the amplifying means.

* * * * *